(12) United States Patent
Krauth et al.

(10) Patent No.: US 7,429,085 B2
(45) Date of Patent: Sep. 30, 2008

(54) SEAT, PARTICULARLY AN AIR PASSENGER SEAT

(75) Inventors: Hubert Krauth, Mainhardt (DE); Oliver Forgatsch, Winnenden (DE); Andreas Nowak, Aspach (DE)

(73) Assignee: Recaro Aircraft Seating GmbH & Co. KG, Schwäbisch Hall (DE)

( * ) Notice: Subject to any disclaimer, the term of this patent is extended or adjusted under 35 U.S.C. 154(b) by 18 days.

(21) Appl. No.: 10/577,263

(22) PCT Filed: Sep. 28, 2004

(86) PCT No.: PCT/EP2004/010986

§ 371 (c)(1),
(2), (4) Date: Apr. 26, 2006

(87) PCT Pub. No.: WO2005/051764

PCT Pub. Date: Jun. 9, 2005

(65) Prior Publication Data

US 2007/0029861 A1    Feb. 8, 2007

(30) Foreign Application Priority Data

Nov. 5, 2003  (DE) ................................. 103 51 692

(51) Int. Cl.
*A47C 7/02* (2006.01)

(52) U.S. Cl. .................................................. 297/452.2
(58) Field of Classification Search ................ 297/452.2
See application file for complete search history.

(56) References Cited

U.S. PATENT DOCUMENTS

| | | | | |
|---|---|---|---|---|
| 5,412,860 A | * | 5/1995 | Miyauchi et al. | ...... 297/452.2 X |
| 5,655,816 A | * | 8/1997 | Magnuson et al. | ....... 297/452.2 |
| 5,685,614 A | | 11/1997 | Chabanne | |

FOREIGN PATENT DOCUMENTS

| | | |
|---|---|---|
| DE | 1 945 583 | 6/1970 |
| DE | 41 38 647 | 5/1992 |
| DE | 298 16 819 | 12/1998 |
| DE | 100 19 484 | 10/2001 |
| DE | 100 50 151 | 3/2002 |
| EP | 0 989 019 | 3/2000 |

* cited by examiner

*Primary Examiner*—Rodney B. White
(74) *Attorney, Agent, or Firm*—Posz Law Group, PLC

(57) ABSTRACT

A seat, particularly an air passenger seat, includes a seat part and a backrest. The backrest has a backrest element (10) with an arched, one-piece frame part (12) having at least one hollow profile (14). In order for the frame part (12) to have, at least in part, at least one additional hollow profile (16) and for the adjoining hollow profiles (14, 16) to be situated one behind the other in the normal direction of movement (flying direction (18)) of the seat, the backrest element is reinforced in the relevant areas in such a manner that, even in the event of a crash, the base frame structure remains intact.

18 Claims, 2 Drawing Sheets

SEAT, PARTICULARLY AN AIR PASSENGER SEAT

FIELD OF THE INVENTION

The present invention relates to a seat, particularly an air passenger seat, having a seat component and a backrest. The backrest has a backrest element with a bent, one-piece frame component formed of at least one hollow section.

BACKGROUND OF THE INVENTION

DE 100 50 151 C1 discloses a backrest element for a seat fixture with a frame of wood, light metal, or plastic forming the edge outline. A frame has, at least in some areas, a groove introduced into the narrow side of the edge. A pouch-like covering is pulled over the frame, and has piping which corresponds to the groove when in the use position and which is introduced into the groove inside the pouch on the covering. As additional configuration of the disclosed solution, the groove receiving the piping is configured in the side edges and in the upper edge of the backrest frame. The edges of the side of the frame may be designed in the lower area to be offset slightly inward and to have no groove. In the disclosed solution, the backrest is configured to be curved to achieve optimum seating comfort and in particular to provide support for the back of a seat occupant. In addition, the frame metal is in the form of a backrest shell with mounting surfaces for the respective fabric component mounted on the front and rear sides. Mounting surfaces of plastic or leather or composite materials may be used in place of textiles. The center area is clear of the backrest element so that to this extent covering of the backrest continues without additional support. Because of the elastic configuration of the cover component, the area of the back of a seat occupant is nevertheless supported safely and comfortably during the seating process.

In the disclosed solution, the cover of the backrest is guided along the side edge component element, without undesirable movement of the cover off center, since the inner piping of the cover is guided inside the piping groove. However, the disclosed solution may not be transferred to seats, such as motor vehicle or aircraft passenger seats. For one thing, the frame structure as configured is too weak to absorb the forces arising in the event of a crash. For another, there is no assurance that in the event of application of a heavy load to the backrest structure the piping component and accordingly the cover structure would not be unintentionally pulled out of the receiving groove in the side edges of the frame component, resulting in separation of the cover from the backrest.

SUMMARY OF THE INVENTION

An object of the present invention is to provide a seat having a backrest component permitting greater safety, especially in the event of a crash.

The object is basically attained, according to the present invention, by a seat having a frame component that has, at least to some extent, an additional hollow section and juxtaposed hollow sections mounted one after the other in the customary direction of movement (direction of flight) of the seat. A two-chamber hollow section solution is achieved for the bent, one-piece frame component in the relevant area, to make the backrest element rigid in the relevant areas to the extent that the base frame structure of the backrest element is substantially preserved even in the event of a crash. This structure is not unintentionally folded together nor fails in another direction harmful to the seat occupant. In addition, because of the hollow-section configuration, the rigidified solution of the present invention is not made heavier than the flat contact surfaces of the conventional solution described above. This lack of additional weight is a factor, especially if the seat of the present invention is used in aircraft, where weight reduction is known to increase the payload. Also, the covering elements needed for supplementing the backrest may be more securely fastened to the hollow-chamber section solutions than to the conventional groove-piping fastenings mounted on the sides of the frame component.

In one preferred embodiment of the seat of the present invention the backrest element has the double-chamber hollow section in its lower area when in the service position, preferably in the area of the lower third of this backrest element. The rigidity of the backrest element structure is of particular importance precisely in this lower area in absorption of crash forces. Additional weight may also be conserved by not providing the double-chamber hollow section for the entire frame component, but exclusively for the area of the backrest of particular relevance to safety engineering, an area in which the backrest is hinge-connected to the point of transition to the conventional seat element so that its tilt may be adjusted.

In another especially preferred embodiment of the seat of the present invention, the backrest element is bent in the shape of a U, with a common chamber wall separating the adjacent hollow sections. This arrangement results to a great extent in the torsional rigidity desired for the backrest, so that the forces of the seat occupant are absorbed in each seating position reliably and comfortably for the seat occupant. A contribution to this end is also made preferably by the cross section selected for the hollow section preceding in the usual direction of movement being the same as or larger than the cross section of the following hollow section.

In another preferred embodiment of the seat of the present invention, the chamber wall of the preceding front hollow section facing in the usual direction of movement (direction of flight) is provided with a slant extending in the longitudinal direction of the backrest. The slant forms an imaginary V with the opposite slant of the other front hollow section of the U-shaped frame component. In this way, a part of the fabric element, which may be fastened to the U-shaped frame component, is supported in two dimensions by those slants, so that an effective support is obtained. The fabric elements which may be received in longitudinal recesses of the hollow section are then deviated by more than 90°, so that undesirable removal from the fastening groove in the section is reliably prevented.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
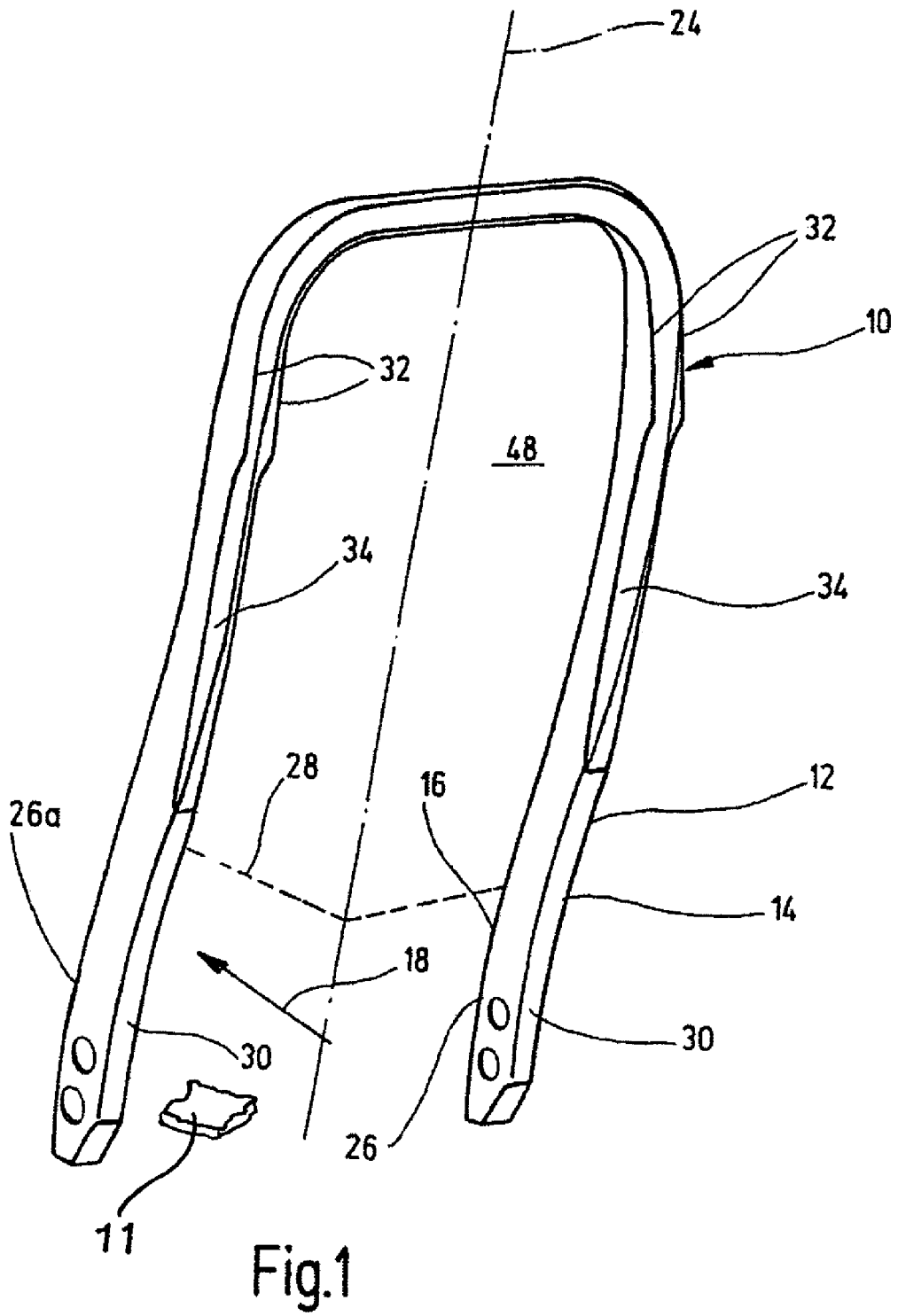
FIG. 1 is a diagrammatic, not to scale, perspective rear view of a one-piece frame component of the backrest bent to form a U according to an embodiment of the present invention.

A modern aircraft passenger seat of the latest generation is described, for example, in DE 100 19 484 (corresponding to U.S. Pat. No. 6,769,739). The solution in DE 100 19 484 relates to an aircraft passenger seat having a seat element and a backrest held so as to be movable in relation to each other by at least one adjustment unit. The adjustment unit has several articulations connected to each other at least in part by a bar support structure with individual bar components which hold the seat element upright in relation to a floor of a motor vehicle or aircraft. By an actuating unit, the components of the aircraft passenger seat are made to execute positioning movements by which the seat component may be moved from an initial position to at least one other position and back. In addition to the seat component, the other components of the seat such as foot and leg support and backrest may be positioned at a large number of freedom of movement degrees so that, in addition to various comfort positions, a rest position is reached for the seat occupant. In the rest position, the backrest is made by a restraint, as a result of tilting movement of the bar support structure, to follow the inclination of the seat component so that an inclined rest surface is formed for the seat.

The backrest element 10 described herein and illustrated in the figures is preferably used for aircraft passenger seats configured for this purpose with a seat component 11. The backrest element 10 is outfitted with a one-piece frame component 12 bent to assume the shape of a U and is formed of at least one first or rear hollow section 14. In addition to this first hollow section 14, the frame component has at least in part another second or front hollow section 16. The adjoining hollow sections 14, 16 are mounted so as to be positioned one behind the other in the customary direction of flight of the seat (flight direction 18). The respective flight direction 18 is indicated by an arrow in FIG. 1.

Figure 2:
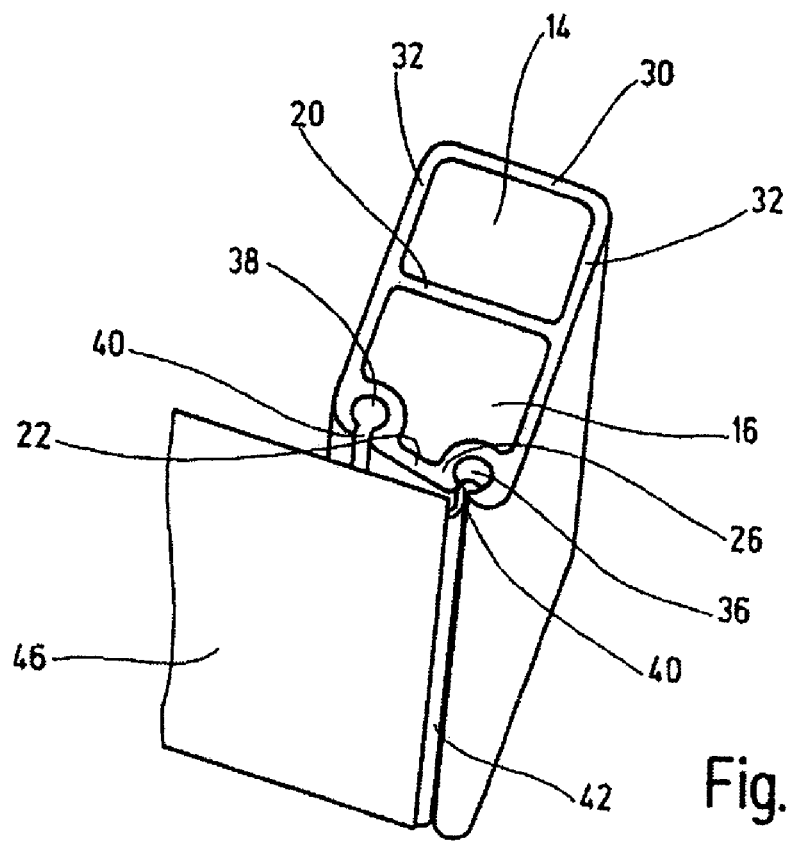
FIG. 2 is a perspective top view of a cross section of the two-chamber hollow section of the backrest frame component shown in FIG. 1, with a piping section being used to fasten a cover element on the backrest element.
Figure 3:
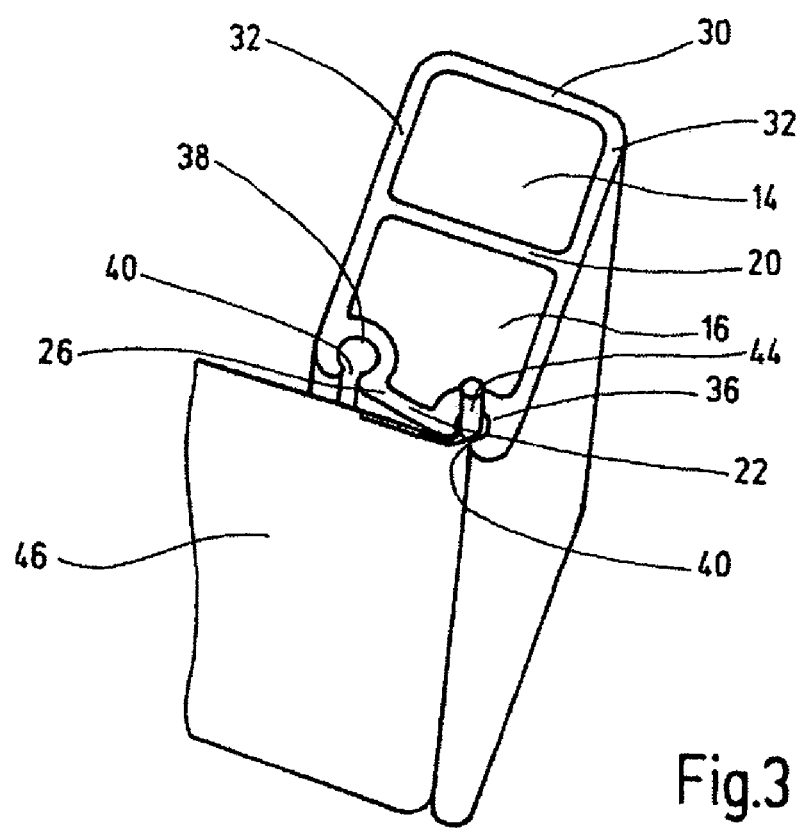
FIG. 3 is a perspective top view of a cross section of the two-chamber hollow section of the backrest frame component of FIG. 1, with a fastening wire or rod to fasten a cover element on the backrest element.

When the seat is in the service position, as illustrated for the back element 10 in FIG. 1, back element 10 has the double-chamber hollow section 14, 16 in the area of its lower third. As shown in FIGS. 2 and 3 in particular, a common chamber wall 20 separates adjoining hollow sections from each other. In FIGS. 2 and 3, the cross section of the hollow section 16 which is in front in the customary direction (direction of flight 18) is the same size as or larger than the cross section of the following hollow section 14. The chamber wall facing in the direction of the customary direction of movement (flight direction 18) of the preceding front hollow section 16 is provided with a bevel 26 extending in the longitudinal direction 24 of the backrest. This bevel 26 forms with the opposite bevel 26a of the other front hollow section 16 of the U-shaped frame component 12 an imaginary V 28. The bevels 26, 26a by their imaginary extensions meet in the area of the longitudinal direction or axis 24 of the backrest. The cross sections of the two hollow sections 14, 26 are otherwise configured to be more or less square or rectangular. The corners of the respective section 14, 16 preferably are rounded.

As seen in FIG. 1, the rear hollow section 14 is in the clear, especially in the upper third of the section wall 30 opposite the bevel 26, 26a, so that there remain in this area more or less only the web walls 32 extending in parallel with each other. The web walls are cut back even further in the direction of the chamber wall 20 in the upper closing area of the frame component 12. To make room for reception of a table component (not shown) which may be folded so as to be integrated into the backrest, in the rear area of the backrest, a corresponding recess 34 is made in the central third of the frame component 12 such that the web walls 32 are also cut back as far as the chamber wall 20.

To the extent that the web walls 32 remain in the area of the upper two-thirds of the frame component 12, they also contribute to this extent also to stabilization of the entire backrest element 10. As is shown in the illustrations in FIGS. 2 and 3, the respective bevels 26, 26a are each delimited on the edge side by a longitudinal duct 36, 38 extending into the interior of the other hollow section 16 and accordingly integrated into it. The longitudinal ducts 36, 38 are ring-shaped in cross section, and, in the direction of bevels 26, 26a, communicate with the exterior by a strip opening 40. The longitudinal ducts 36, 38 serve either to receive a piping section 42 (see FIG. 2) or to receive a bar or wire section 44 (see FIG. 3).

A cover component 46 such as one in the form of a net, as shown in FIGS. 2 and 3, or in the form of a cover fabric, leather cover, or the like (not shown) may be fastened on the backrest element 10 by the sections 42, 44. For this purpose, the piping section 42 may be configured as a plastic section strip connected to the cover component 46 by an adhesion or extrusion process. In FIG. 3, the cover component 46 is wrapped around the bar or wire section 44 and fastened by clamping in the associated opening 40. In that two longitudinal ducts 36, 38 are present in the area of the bevels 26, 26a, the duct 38 on the left as viewed in FIGS. 2 and 3, for example, may serve to receive the net as cover component 46, and the right duct 36 may receive a cover material or a leather cover component, which in turn is fastened as is the net and then overlaps this net toward the exterior.

As a rule, the longitudinal ducts may also be positioned in the area of the rear hollow section 14 to participate in covering the double-chamber hollow section by another cover component (not shown). In any event, the bevels 26, 26a provide a level surface for application of the cover component 46 extending over the bevels, so that improved support is achieved to this extent. The bevels 26, 26a also permit deflection of the respective cover component by more than 90° with respect to the outer longitudinal duct as viewed in FIGS. 2 and 3, so that greater diversion of force is achieved. This arrangement also makes certain that the respective cover component 46 may not be pulled out of the longitudinal duct 36 by the associated end section 42, 44. The cover component 46 extends over the clear area of the frame component 12, and thus, is limited by the frame component on the edge side.

The present invention need not be limited to use in aircraft passenger seats but as a rule may be applied to any seat, in the area of motor vehicles as well. It is especially well suited in instances in which high rigidity accompanied by low weight is desired. By preference, the hollow-chamber section is obtained by a conventional extrusion process.

While one embodiment has been chosen to illustrate the invention, it will be understood by those skilled in the art that various changes and modifications can be made therein without departing from the scope of the invention as defined in the appended claims.

What is claimed is:
1. A passenger seat, comprising:
a seat component;
a backrest having a backrest element and a curved, U-shaped, one-piece frame component with first and second legs having front and rear hollow sections, with said rear hollow sections adjoined behind said front hollow sections in a direction of normal seat movement, each said front hollow section being at least as large as said rear hollow section adjoined thereto in cross section; and first and second bevels extending in a longitudinal direction of said backrest on front chamber walls of said front hollow sections of said first and second legs, respectively, wherein imaginary extensions of said first and second bevels form an imaginary V.

2. A passenger seat according to claim 1 wherein
said front and rear hollow sections are located in lower areas of said first and second legs.

3. A passenger seat according to claim 2 wherein
said lower areas are lowest thirds of said legs.

4. A passenger seat according to claim 1 wherein
a common chamber wall separates said front and rear hollow sections of each said leg.

5. A passenger seat according to claim 4 wherein
each said rear hollow section is clear of a rear section wall opposite the respective bevel in an upper third of the respective leg at least to some extent along said backrest element in a use position thereof.

6. A passenger seat according to claim 1 wherein
at least one of said front and rear hollow sections comprises a longitudinal duct to receive one of a piping section and a bar section fastening a flat cover component to said backrest.

7. A passenger seat according to claim 6 wherein
said longitudinal duct is integrated with the respective hollow section.

8. A passenger seat according to claim 1 wherein
first and second longitudinal ducts are mounted in corner areas of said first and second bevels of said front hollow sections, each of said longitudinal ducts having an engagement opening communicating with the respective bevel.

9. A passenger seat according to claim 8 wherein
a net faces and is mounted in said first longitudinal ducts; and
a cover material faces and is mounted in said second longitudinal duct.

10. A passenger seat, comprising:
a seat component;
a backrest having a backrest element and a curved, one-piece frame component having front and rear hollow sections, with said rear hollow section adjoined behind said front hollow section in a direction of normal seat movement; and
a longitudinal duct in at least one of said front and rear hollow sections receiving one of a piping section and a bar section fastening a flat cover component to said backrest.

11. A passenger seat according to claim 10 wherein
said front and rear hollow sections are located in a lower area of said frame component.

12. A passenger seat according to claim 11 wherein
said lower areas are lowest thirds of said legs.

13. A passenger seat according to claim 10 wherein
a common chamber wall separates said front and rear hollow sections.

14. A passenger seat according to claim 13 wherein
each said rear hollow section is clear of a rear section wall in an upper third of said backrest element in a use position thereof.

15. A passenger seat, comprising:
a seat component;
a backrest having a backrest element and a curved, one-piece frame component having front and rear hollow sections, with said rear hollow section adjoined behind said front hollow section in a direction of normal seat movement; and
a longitudinal duct integrated into said front hollow section receiving one of a piping section and a bar section fastening a flat cover component to said backrest.

16. A passenger seat according to claim 15 wherein
a common chamber wall separates said front and rear hollow sections.

17. A passenger seat according to claim 1 wherein
said front and rear hollow sections are located in a lower area of said frame component.

18. A passenger seat, comprising:
a seat component;
a backrest having a backrest element and a curved, one-piece frame component having front and rear hollow sections, with each said rear hollow section adjoined behind the respective front hollow section in a direction of normal seat movement;
first and second bevels extending in a longitudinal direction of said backrest on front chamber walls of said front hollow sections; and
first and second longitudinal ducts mounted in corner areas of said first and second bevels of front hollow sections, each of said longitudinal ducts having an engagement opening communicating with the respective bevel.

* * * * *